T. CADWALLADER.
HYDRAULIC MOTOR.
APPLICATION FILED MAY 31, 1918.
1,301,225.
Patented Apr. 22, 1919.
2 SHEETS—SHEET 1.
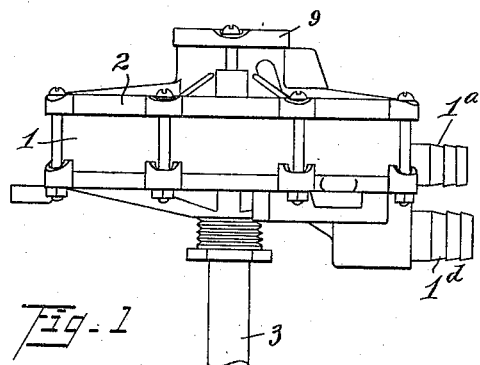
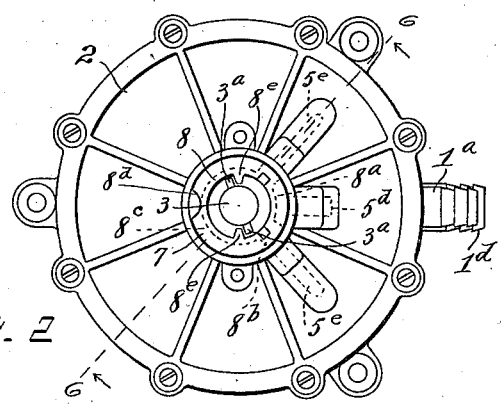
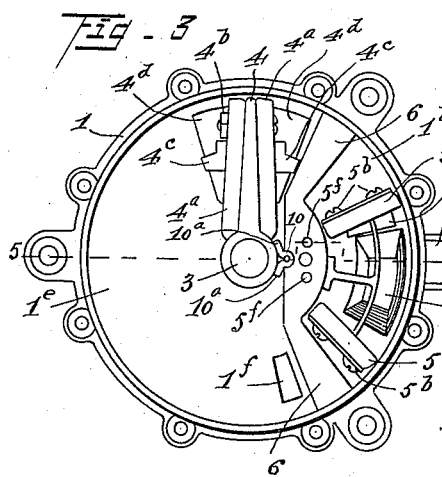
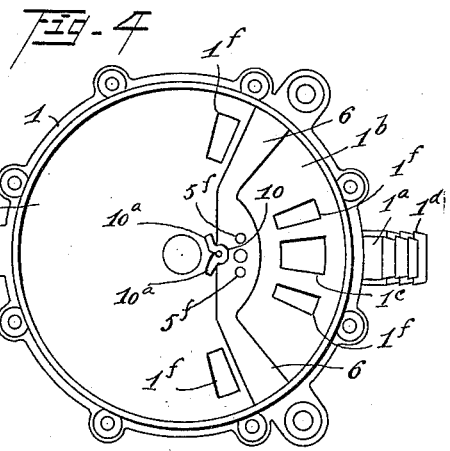
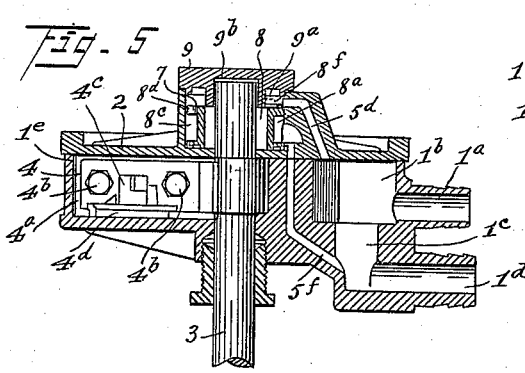
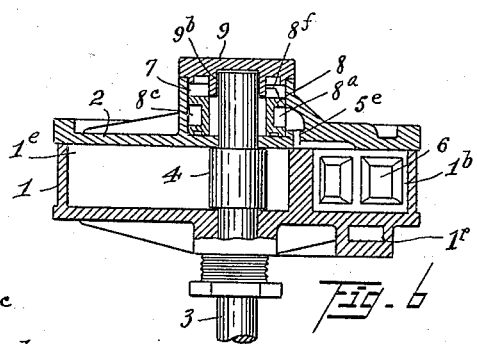
Inventor
Thomas Cadwallader
By Obed C. Billman Atty.

T. CADWALLADER.
HYDRAULIC MOTOR.
APPLICATION FILED MAY 31, 1918.
1,301,225.
Patented Apr. 22, 1919.
2 SHEETS—SHEET 2.
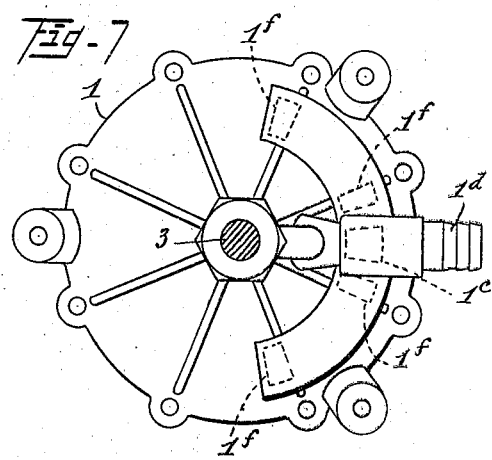
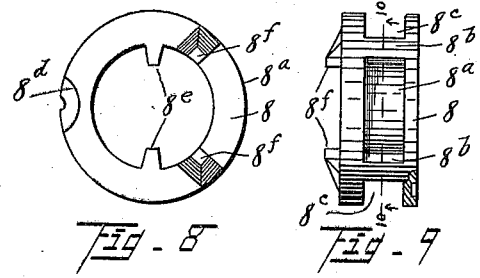
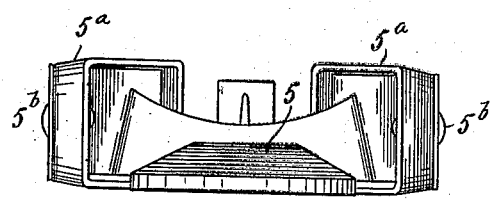
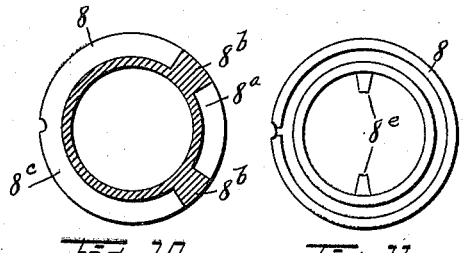
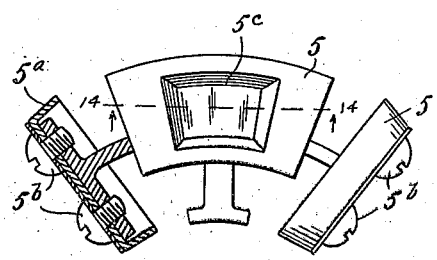
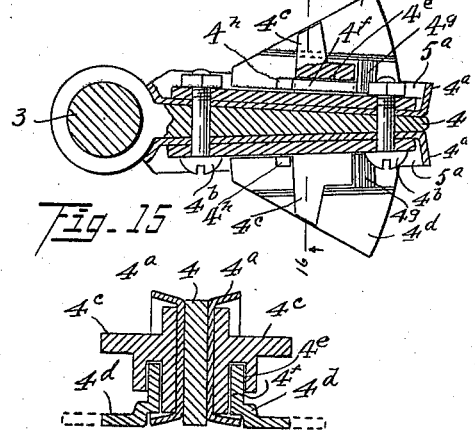
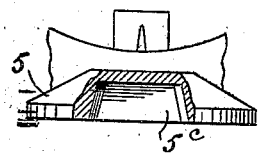
Inventor
Thomas Cadwallader
By Obed S. Billman Atty.

UNITED STATES PATENT OFFICE.

THOMAS CADWALLADER, OF SALEM, OHIO.

HYDRAULIC MOTOR.

1,301,225.       Specification of Letters Patent.     Patented Apr. 22, 1919.

Application filed May 31, 1918. Serial No. 237,637.

*To all whom it may concern:*

Be it known that I, THOMAS CADWALLADER, a citizen of the United States, residing at Salem, in the county of Columbiana and State of Ohio, have invented new and useful Improvements in Hydraulic Motors, of which the following is a specification.

My invention relates to improvements in hydraulic motors, said invention embodying an improved fluid operated oscillatory piston operating in coöperative relation to an improved fluid operated main valve and an improved mechanically operated auxiliary or pilot valve.

The primary object of my invention is to provide a generally improved motor of this class, which will be exceedingly simple in construction, cheap of manufacture and efficient in use.

A further object of the invention is to provide a hydraulic motor of the type specified, without springs or gears, with a minimum number of moving parts which do not require adjustment, designed to operate in any position, utilizing the operating pressure for holding the valve parts in their proper position at all times, and automatically taking up any possible wear that may occur.

A still further object of the invention is to provide a cap or cover for the auxiliary or pilot valve compartment permitting free access to the valve and packing and containing a piston shaft bearing which may be conveniently renewed when necessary.

A still further object of the invention is to provide a more efficient hydraulic motor through a design permitting a larger exhaust passage than that of the intake passage, thereby permitting a comparatively free exhaust and adding to the efficiency of the motor by not confining the exhaust volume to a small passage.

A still further object in design is to provide a hydraulic motor with intake and exhaust passages at lower extremities of motor that it may be conveniently drained on disconnecting hose.

The improved motor is also designed to operate very quietly by providing piston wings or segments which pass over and gradually cut off the exhaust passage near the end of the piston stroke, thereby preventing the piston from fully striking the abutment, the segment piston wings being movable vertically, permitting fluid pressure to initially enter when the valve is to be initially moved in its reverse direction.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a side elevation of a motor constructed in accordance with this invention.

Fig. 2, a top plan view of the same, the auxiliary or pilot valve cover being removed for the purpose of clearer illustration of the parts.

Fig. 3, a top plan view of the same, the piston and main valve being in their respective shifted positions, preparatory to the initial movement of the piston on its working stroke, the main casing top or cover being removed for the purpose of clearer illustration of the internal parts.

Fig. 4, a top plan view of the same, the piston and main fluid operated valve being removed to more clearly illustrate the relative position and arrangement of the ports leading to and from the same.

Fig. 5, a cross sectional view taken on line 5—5, of Fig. 3, the piston being moved to an intermediate position in its working stroke, the main fluid operated valve, however, being removed.

Fig. 6, a sectional view taken on line 6—6, of Fig. 2, the pilot valve cover being in position.

Fig. 7, a plan view of the under or reverse side of the motor casing.

Fig. 8, an enlarged top plan view of the pilot valve, detached. Fig. 9, an edge view of the same. Fig. 10, a horizontal sectional view of the same. Fig. 11, a plan view of the under side of the same. Fig. 12, an enlarged edge view of the fluid operated main or slide valve detached. Fig. 13, a view of the under or reverse side of the same, one of the valve cup heads being shown in horizontal section.

Fig. 14, a fragmentary view partly in section of the intermediate or port portion of the slide valve. Fig. 15, an enlarged horizontal sectional view of the wing piston.

Fig. 16, a cross sectional view taken on line 16—16, of Fig. 15.

Fig. 17, a perspective view of one of the floating piston wings, detached.

The improved motor comprises a suitable motor casing 1, provided, in the present instance, with a top or cover 2, said casing being provided with a piston shaft 3, operated by means of a piston 4.

The casing 1, is provided with a suitable inlet port $1^a$, communicating with a valve chamber $1^b$, provided with a fluid operated main valve 5, adapted to control the admission of operating fluid to the oscillatory piston 4, as hereinafter described, said main valve chamber $1^b$, being provided with a main or intermediate outlet port $1^c$, leading to the main discharge conduit $1^d$.

The motor casing is provided with a pair of abutments 6, forming on one side the valve chamber $1^b$, referred to, and on the other,—a piston compartment or chamber $1^e$, said valve and piston chambers $1^b$ and $1^e$, respectively, being adapted to be brought into and out of communication with each other through the medium of the oppositely arranged ports $1^f$, said ports, in the present instance, being formed in the lower wall or floor of the motor casing, and extending beneath the abutments 6, and being alternately transformed into inlet and outlet ports through the medium of the reciprocatory fluid operated main valve 5.

The main valve 5, is slidably mounted in the valve chamber $1^b$, and is provided at its ends with the winged cup members $5^a$, removably secured and held in position by means of the screws $5^b$.

As a means of alternately throwing the oppositely arranged ports $1^f$, into and out of communication with the main discharge conduit $1^d$, and also into and out of communication with the piston chamber $1^e$, for the operation of the piston, the valve 5, is provided on its under side with an undercut portion or pocket $5^c$, adapted to alternately bridge the space between the ports $1^f$, and the main discharge port $1^c$, during the reciprocation of the main valve 5, it being obvious that when the main valve 5, is at one end of its working stroke, as illustrated for example in Fig. 3, of the drawings, that the intermediate portion of the main valve 5, will uncover one of the ports $1^f$, for the admission of the operating fluid therethrough and between one of the abutments 6, and the piston to operate the latter in its working stroke, while on the other hand the opposite port $1^f$, will be covered and transposed into an outlet port by being brought into communication with the undercut portion or pocket $5^c$, of the valve, and thus be brought into communication through the pocket or conduit with the main discharge port $1^c$.

Referring now to the auxiliary or pilot valve for controlling the reciprocation of the main valve 5, with reference to the working stroke of the piston 4, it will be observed that the top plate or cover 2, of the motor casing is provided with an inlet port $5^d$, leading to a centrally located auxiliary or pilot valve chamber 7, the latter being provided with a mechanically operated auxiliary or pilot valve 8, said valve 8, being provided with an intermediate groove or conduit $8^a$, adapted to alternately connect the exhaust ports $5^f$, and one of the adjacent side ports $5^e$, leading to the main valve chamber $1^b$, and near the ends of the latter, said side ports $5^e$, being adapted to be alternately thrown into and out of communication with the main inlet port $5^d$ through the second annular groove or conduit $8^c$, of the pilot valve, and alternately transposed into inlet and outlet ports for communication with the space between the ends of the cup members $5^a$, and the abutments and reciprocating the main valve 5, at the end of the working stroke of the piston, the screws $5^b$, of the main valve 5, being adapted to act as stop members in engagement with the abutments 6, in limiting the movements of the main valve and in providing intermediate chambers alternately communicating with the side ports leading from the auxiliary valve chamber 7, and it will also be observed that the bridge members $8^b$, at the terminal portions of the groove or conduit $8^a$, are adapted to reciprocate over and between the side ports $5^e$, and the main outlet ports $5^f$, said outlet ports being thereby adapted by means of said bridge members $8^b$, to be alternately brought into and out of communication with the side ports $5^e$, thereby alternately transforming the latter into inlet and outlet ports, the movements of said bridge members $8^b$, beyond the side ports $5^e$, bringing the latter into communication as exhaust ports through the groove or conduit $8^a$, with said outlet ports $5^f$.

The pilot valve 8, is also provided with a second groove or conduit $8^c$, adapted to be alternately thrown into and out of communication with the side ports $5^e$, by the reciprocation of the bridge members $8^b$, the latter alternately covering and uncovering such side ports $5^e$, at the ends of the working stroke of the piston for the reciprocation of the main valve 5, said second groove $8^c$, being in communication at all times with the operating fluid in the upper portion of the valve chamber 7, through the medium of the recess port $8^d$.

The operating fluid passes into the pilot valve chamber 7, through the main inlet port $5^d$, leading upwardly from the main valve chamber $1^b$, (see Fig. 5), such operating fluid passing over and above the pilot valve 8, a large portion of such operating fluid passing into the annular groove or conduit $8^c$, through the recess opening or port $8^d$, the reciprocation of the pilot valve causing the bridge members $8^b$, (see Figs. 9 and 10) to pass over the ports $5^e$, as illustrated most clearly in Fig. 2, of the drawings, and thus alternately transpose such ports $5^e$, into inlet and outlet ports, each port when transposed into an inlet port permitting operating fluid to pass in through the groove or conduit $8c$, while the opposite port $5^e$, is transposed into an outlet or eduction port to permit the operating fluid to pass from the rear of the valve 5, (in the return movement of the latter) through the annular groove or recess $8^a$, and thence into the outlet ports $5^f$, leading to the main discharge conduit $1^d$, as shown most clearly in Fig. 5, of the drawings.

As a means of mechanically operating the auxiliary or pilot valve 8, at the ends of the working strokes of the piston, the upper end of the piston shaft 3, is provided with oppositely located projections $3^a$, adapted to alternately engage with inwardly extending projections $8^e$, of the reciprocatory pilot valve 8, a valve cover or cap 9, is provided with downwardly extending projections $9^a$, adapted to alternately engage upwardly extending projections $8^f$, of the valve 8. The valve cover or cap 9, is also provided with a bearing opening $9^b$, adapted to receive and contain the upper end of the piston shaft 3.

As a means of effectively preventing the flow or leakage of operating fluid between the fluid pressure chambers during the reciprocation of the piston, a substantially U-shaped packing 10, is mounted between a hub portion of the piston and the adjacent intermediate wall of the chamber, said packing being provided with wings $10^a$, bearing against such piston hub at all times and effectively sealing the intervening space.

The opposite or face sides of the piston 4, are provided with packing members $4^a$, secured, in the present instance, by means of bolts $4^b$, said piston being also provided with oppositely extending stop members $4^c$, adapted to positively limit the movements of the piston with respect to the abutments 6, and as a means of effectually cushioning the piston at the ends of its working strokes through the operating fluid, the stop members $4^c$, are provided with vertically movable or floating wings $4^d$, adapted to initially cut off and reduce the area of the adjacent outlet port $1^f$, near the terminating portion of the working stroke of the piston, the force of the operating fluid in passing out of such port holding the adjacent wing $4^d$, against the bottom of the chamber, and as a means of permitting the operating fluid to readily flow into the chamber when the port is transposed into an inlet port for the initial reverse movement of the piston, the wings $4^d$ are movably mounted for vertical movement on the under sides of the stop members $4^c$, (see Figs. 15 and 16) so that the operating fluid will readily elevate or open the wings upon entering prior to and upon the initial reverse or return movement of the piston, such wings thus operating at the ends of the working strokes of the piston similar to check valves with respect to said ports $1^f$, and the regulation of the flow of the operating fluid therethrough.

As a means of loosely and removably securing the wings $4^d$, to the stop members $4^c$, the latter are provided on their under sides with grooves $4^e$ (see Figs. 15 and 16) adapted to loosely receive and contain flange members $4^f$, (see Fig. 17) and as a means of preventing relative longitudinal movement the flange members terminate at one end in tapered lug members $4^g$, adapted to fit into corresponding recesses on the under side of the stop members $4^c$, and at the other in upwardly extending fingers $4^h$, adapted to engage with the opposite portions of the stop members $4^c$, the lower portions of the packing members $4^a$, on the under sides of the wing members $4^d$, serving to movably and resiliently retain the wings $4^d$, in position, as shown most clearly in Fig. 16, of the drawings.

From the foregoing description, taken in connection with the accompanying drawings, the operation and advantages of my invention will be readily understood.

Having thus described one of the embodiments of my invention, what I claim and desire to secure by Letters Patent, is,—

1. In a hydraulic motor, a motor casing having valve and piston chambers the latter being provided with ports communicating with said valve chamber, and a piston provided with floating wings projecting in advance of said piston to reduce the size of said ports at the ends of the working strokes of said piston thereby forming fluid buffers therefor.

2. In a hydraulic motor, the combination with a piston chamber having ports; of a piston having floating wings reciprocable between and adapted to gradually reduce the area and cut off the latter near and at the end of the working stroke of said piston, said wings acting as check valves to said ports when closed and to automatically open and permit the inlet of operating fluid therein for the initial return working stroke of said piston.

3. In a hydraulic motor, a motor casing having a segmental piston chamber provided with ports, and a piston having floating wings reciprocable between said ports and cutting off the latter near the ends of the working strokes of said piston thereby forming piston checking cushioning fluid, said wings automatically opening said ports for the inlet of fluid therethrough upon the initial reverse working stroke of said piston.

4. In a hydraulic motor, a motor casing having a piston chamber provided with ports, and a piston having floating wings reciprocable between said ports and adapted to cut off the latter near the ends of the working strokes of said piston thereby forming a piston checking cushioning fluid, said wings being adapted to automatically open said ports for the inlet of fluid therethrough upon the initial reverse working stroke of said piston.

5. In a hydraulic motor, the combination with a segmental piston chamber having ports at its ends, and a shaft having a wing piston reciprocable in said chamber between said ports, said wing piston having stop projections on its face sides, and movable wings on said wing piston adapted to close said ports near the ends of the working strokes of said wing piston and to open said ports prior to the initial working strokes of said wing piston.

6. In a hydraulic motor, the combination with a piston chamber having ports; of a piston having stop members carrying floating wings reciprocable between and adapted to gradually reduce the area and cut off the latter near and at the end of the working stroke of said piston, respectively, said wings acting as check valves to said ports when closed and being adapted to automatically open and permit the inlet of operating fluid therein for the initial return working stroke of said piston.

7. In a hydraulic motor, a motor casing having segmental valve and piston chambers the latter being provided near the ends of its floor wall with ports communicating with said valve chamber, and a piston provided on its opposite faces with floating wings normally carried in frictional engagement with said floor wall and projecting sufficiently in advance of said piston to gradually cover and reduce the size of said ports at the ends of the working strokes of said piston to form fluid buffers therefor.

8. In a hydraulic motor, the combination with a segmental piston chamber having ports at its ends, and a shaft having a wing piston reciprocable in said chamber between said ports, said wing piston having oppositely extending stop projections on its face sides, and movable wings on said wing piston adapted frictionally to engage within said piston chamber and close said ports near the ends of the working strokes of said wing piston and to open said ports prior to the initial working strokes of said wing piston.

9. A hydraulic motor, comprising a motor casing provided with main inlet and outlet ports and abutments forming valve and piston chambers, an oscillatory piston in said piston chamber adapted to travel between said abutments, said valve chamber having end ports, an oscillatory main valve in said valve chamber provided with an undercut pocket communicating at all times with said main outlet port and alternately throwing the latter into and out of communication with said end ports, and a pilot valve mechanically controlled by said piston for operating said main valve and piston in coöperative relation to each other.

THOMAS CADWALLADER.

Copies of this patent may be obtained for five cents each, by addressing the "Commissioner of Patents, Washington, D. C."